UNITED STATES PATENT OFFICE.

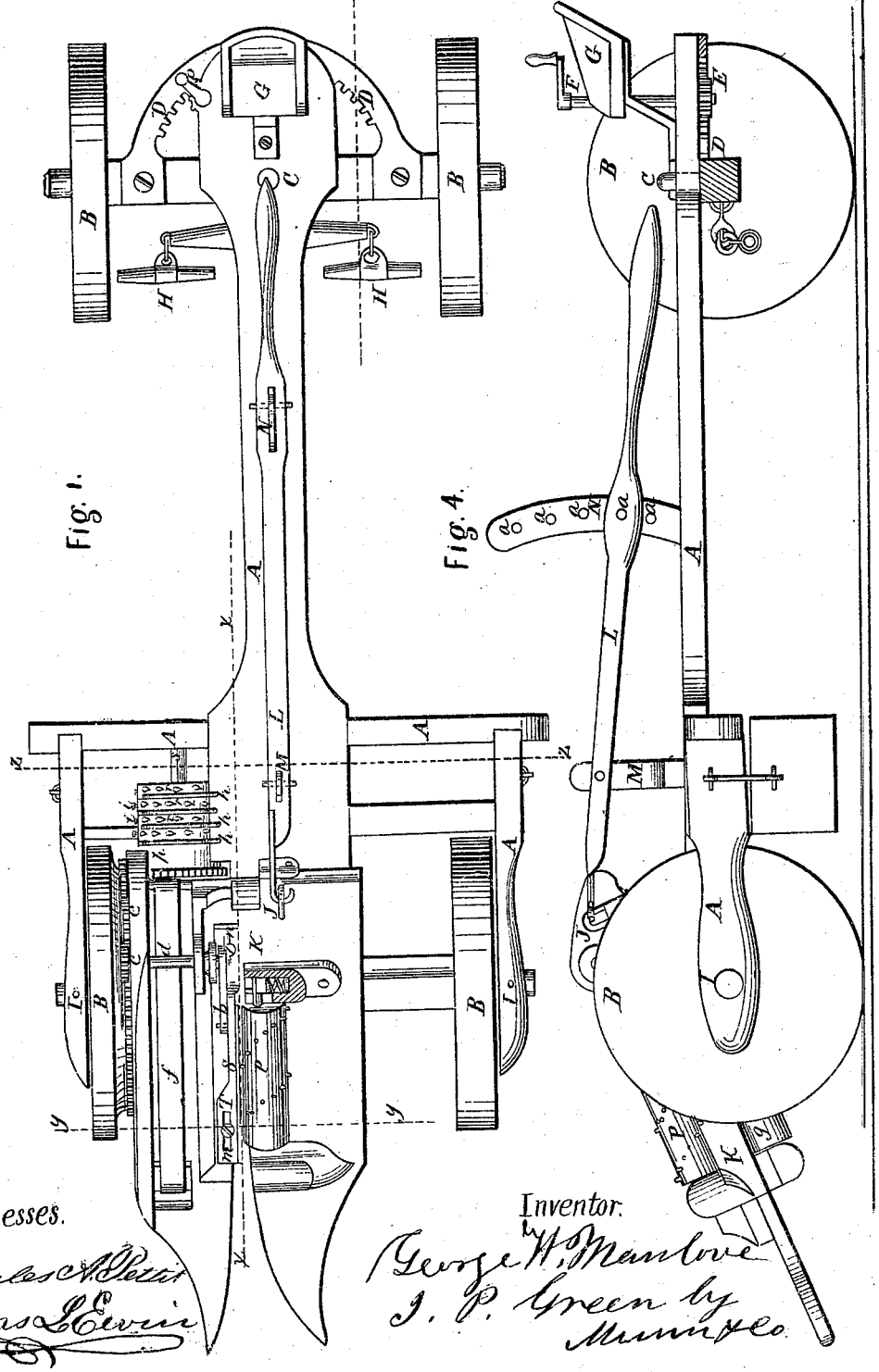

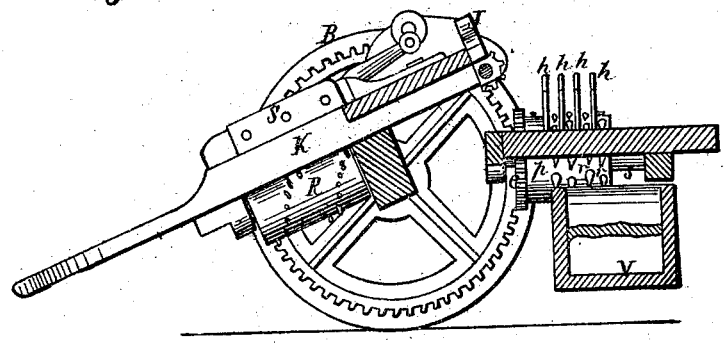
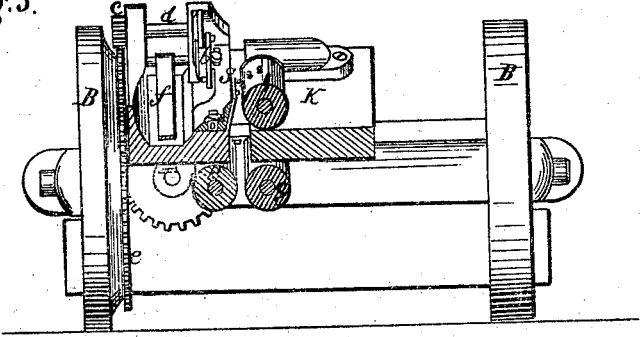
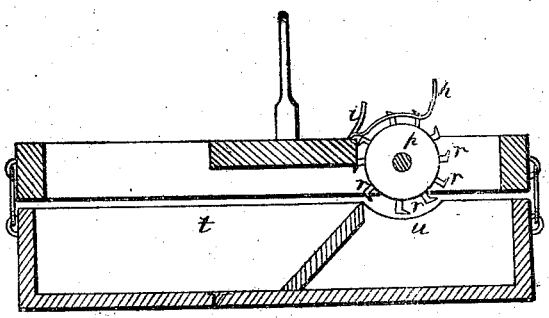

GEO. H. MANLOVE AND J. P. GREEN, OF CHICAGO, ILLINOIS, ASSIGNORS TO GEO. H. MANLOVE.

IMPROVEMENT IN CORN-HARVESTERS.

Specification forming part of Letters Patent No. 58,348, dated September 25, 1866.

*To all whom it may concern:*

Be it known that we, GEORGE H. MANLOVE and JONATHAN P. GREEN, of Chicago, in the county of Cook and State of Illinois, have invented a new and useful Machine for Harvesting and Husking Indian Corn in the field; and we do hereby declare the following to be a full, clear, and exact description of the construction and operation of the same, reference being had to the annexed drawings, making a part of this specification, in which—

Figure 1 is a top view of the combined harvester and husker. Fig. 2 is a longitudinal sectional view, made in the line $x\ x$, Fig. 1. Fig. 3 is a sectional view in the line $y\ y$, Fig. 1. Fig. 4 is a side view, and Fig. 5 represents a sectional view in the line $z\ z$ of Fig. 1.

Similar letters indicate like parts in all the figures.

This invention relates to a machine for harvesting and husking Indian corn in the field, the arrangement of parts being hereinafter more fully described.

To enable others skilled in the art to make and use our invention, we will proceed to describe its construction and operation.

A A is a frame, mounted on four wheels, B B. The rear axle is pivoted to the frame A by a pin, C, Figs. 1 and 4, and has a toothed segment, D, attached to said axle, into which a pinion, E, gears, the latter being operated to guide the machine by a crank-shaft, F, passing through the frame A near the driver's seat G, the horses being attached to the machine at H H between the front and hind axles. The forward part of the frame A is connected with the ends of the front axle at I I.

K is a forked frame, attached to the front axle, to the rear end of which a staple, J, Figs. 1 and 4, is attached, in which is placed the hooked end of the lever L, having its fulcrum in the standard M, attached to the frame A. N is a bent standard, attached at its lower end to the frame A, and passing through a slot in the lever L. $a\ a$ are holes in the bent upright N, for the insertion of a pin, if desired, through the lever L and the upright N.

The lever L extends back near the driver's seat G, so that he can, by operating said lever, raise or depress the forked frame K, so as to adjust it to pick up fallen stalks.

The front part of the forked frame K is curved outwardly, as shown clearly in Fig. 1, in order to receive the stalks of corn to be harvested.

P is a roller, which has its bearings in projections attached to the upper surface of the forked frame K; and R and Q are rollers, similarly attached to the lower surface of the frame.

The rollers P and Q are made to yield laterally in their bearings, and may be armed with teeth arranged spirally or otherwise on their surfaces. One or more reciprocating cutters, S, Figs. 1, 2, and 3, are attached to the upper surface of the forked frame K, lying parallel and near to the roller P. These cutters or cutter are attached to a cutter-bar, T, having slots $m\ n$, Fig. 1, into which set-screws enter, allowing a reciprocating motion to the cutters.

A reciprocating motion is given the cutters by means of a toothed wheel, $e$, Figs. 1 and 3, attached to one of the front wheels of the machine, gearing into the pinion $c$ on the crank-shaft $d$, which is connected by a shaft, $b$, with the cutter-bar T.

$f$ is an endless belt, hung in rollers having their bearings in the forked frame K. The endless belt derives its motion by means of a pinion, around the shaft of which the endless belt passes, the said pinion gearing into the toothed wheel $e$, attached to the fore wheel of the machine.

$p$, Figs. 1, 2, and 5, is the husking-cylinder, which may be made cylindrical or in a tapering form, and is armed with teeth $r\ r$ on its surface. The shaft $s$ of the husking-cylinder has its bearings in the frame A of the machine, and derives its rotary motion from a pinion, $o$, on its shaft $s$, which gears into the toothed wheel $e$, attached to the fore wheel of the machine.

$i\ i$ are bent rods attached to the frame A, and $h\ h$ are rods similarly attached, which are bent over and near the surface of the cylinder, and are then bent upwardly, thus forming a receptacle for the ears of corn conveyed into it by the endless apron, and preventing the kernels from being torn off the cob by the teeth of the cylinder. V, Figs. 2 and 5, is a partitioned box placed under the husking-cylinder, into one part, $t$, of which the husked corn passes by a chute or otherwise, the husks falling in the part $u$, Fig. 5, of the box V.

It is obvious that the gearing could be so arranged as to derive the power from both of the fore wheels.

The operation of the machine is as follows: The horses are attached at H H between the axles, and the machine is put in motion, the driver guiding the machine by means of the crank-shaft situated near his seat, and depressing the forked frame by means of the lever L, if necessary, to pick up any bent stalks. The stalks enter between the open or curved portions of the forked frame, and are supported by the lower rollers attached to the frame, while the upper roller presses the stalk against the cutter or cutters, which, by reason of their reciprocating motion, sever the ear from the stalk, which falls upon the endless apron, which conveys it to the husking-cylinder, where it is deprived of its husks, the ear of corn passing into one part of the partitioned box under the husking-cylinder, and the husks passing into the other part of said box.

Having thus described our invention, what we claim as new, and desire to secure by Letters Patent, is—

1. The forked frame K, in combination with the roller R, yielding rollers P Q, and cutters S, substantially as described.

2. In combination with the above, the endless belt N, substantially as described.

3. The husking-cylinder armed with teeth, as described, and bent rods $i\ i\ h\ h$, in combination with the frame K, cutter S, and endless apron $f$, all constructed and operating substantially in the manner and for the purpose set forth.

4. In combination with the above, the partitioned box V, substantially as described.

5. The frame A, lever L, standards M N, forked frame K, with its rollers P Q R, cutters S, and endless belt $f$, in combination with the husking-cylinder $p$, rods $h\ h\ i\ i$, and partitioned box V, the whole being constructed and operated substantially in the manner and for the purpose set forth.

To the above specification of our machine for gathering and husking Indian corn in the field we have signed our hands this 8th day of May, 1866.

GEORGE H. MANLOVE.
JONATHAN P. GREEN.

Witnesses as to the signature of George H. Manlove:
ALEX. A. C. KLAUCKE,
W. F. HALL.

Witnesses as to the signature of Jonathan P. Green:
JOHN S. RIES,
EDWIN HANN.